US012786535B2

(12) United States Patent
Ueda

(10) Patent No.: US 12,786,535 B2
(45) Date of Patent: Nov. 3, 2026

(54) ELECTRONIC APPARATUS

(71) Applicant: CANON KABUSHIKI KAISHA, Tokyo (JP)

(72) Inventor: Haruhisa Ueda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 19/067,062

(22) Filed: Feb. 28, 2025

(65) Prior Publication Data

US 2025/0287085 A1 Sep. 11, 2025

(30) Foreign Application Priority Data

Mar. 11, 2024 (JP) ................................ 2024-037274

(51) Int. Cl.
*H04N 23/52* (2023.01)
*H04N 23/54* (2023.01)

(52) U.S. Cl.
CPC ............ *H04N 23/52* (2023.01); *H04N 23/54* (2023.01)

(58) Field of Classification Search
CPC ............................... H04N 23/52; H04N 23/54
USPC ........................................................ 348/374
See application file for complete search history.

(56) References Cited

U.S. PATENT DOCUMENTS

| | | | | |
|---|---|---|---|---|
| 2017/0272710 A1* | 9/2017 | Mikawa | ............... | H04N 9/3194 |
| 2017/0272718 A1* | 9/2017 | Mikawa | ............... | H04N 9/3188 |
| 2018/0332735 A1* | 11/2018 | Wei | .................... | H05K 7/20263 |
| 2021/0161039 A1* | 5/2021 | Jung | .................... | H05K 1/0203 |

FOREIGN PATENT DOCUMENTS

JP 2009284414 A 12/2009

* cited by examiner

*Primary Examiner* — Usman A Khan
(74) *Attorney, Agent, or Firm* — Cowan, Liebowitz & Latman, P.C.

(57) ABSTRACT

An electronic apparatus includes a fixed unit, a movable unit that holds an image sensor, is opposite to the fixed unit, and is movable relative to the fixed unit, a heat radiating plate opposite to a surface of the fixed unit, which is opposite to a surface of the fixed unit that is opposite to the movable unit, a first heat radiating member that includes a first connector connected to the movable unit, and a second connector connected to a side of the fixed unit, which is opposite to the heat radiating plate, and a second heat radiating member disposed between the second connector of the first heat radiating member and the heat radiating plate. The first heat radiating member and the heat radiating plate are thermally connected via the second heat radiating member.

12 Claims, 9 Drawing Sheets

ELECTRONIC APPARATUS

BACKGROUND

Technical Field

The present disclosure relates to an electronic apparatus.

Description of Related Art

One conventional electronic apparatus such as an image pickup apparatus has a substrate wiring structure in which a movable unit supported movably on a fixed unit (support unit) and a control substrate are connected by a flexible printed circuit (FPC). For example, an image pickup apparatus having an optical image-stabilizing function of an object achieves image stabilization of the object by moving the movable unit supporting the image sensor relative to the fixed unit in a direction orthogonal to the optical axis.

Since an image sensor provided on the movable unit is to be cooled, a flexible heat-radiating member such as a graphite sheet is usually provided. Japanese Patent Application Laid-Open No. 2009-284414 discloses an image pickup apparatus in which a flexible heat-radiating member is connected to cool the image sensor while the fixed unit and the movable unit are electrically connected.

For the image pickup apparatus disclosed in Japanese Patent Application Laid-Open No. 2009-284414, a reaction force generated by deformation of the heat-radiating member becomes a load in driving the movable unit. Thus, the heat-radiating member that is less flexible may hinder the driving of the movable unit. Since the reaction force of the heat-radiating member applies a load in the optical axis direction of the image sensor, the attachment accuracy of the image sensor may decrease.

SUMMARY

An electronic apparatus according to one aspect of the disclosure includes a fixed unit, a movable unit that holds an image sensor, is opposite to the fixed unit, and is movable relative to the fixed unit, a heat radiating plate opposite to a surface of the fixed unit, which is opposite to a surface of the fixed unit that is opposite to the movable unit, a first heat radiating member that includes a first connector connected to the movable unit, and a second connector connected to a side of the fixed unit, which is opposite to the heat radiating plate, and a second heat radiating member disposed between the second connector of the first heat radiating member and the heat radiating plate. The first heat radiating member and the heat radiating plate are thermally connected via the second heat radiating member.

An electronic apparatus according to another aspect of the disclosure includes a fixed unit, a movable unit that holds an electronic component and is movable relative to the fixed unit, a first heat radiating member and a second heat radiating member configured to transfer heat from the electronic component, a control substrate configured to transmit a signal, a heat radiating plate provided between the fixed unit and the control substrate, a third heat radiating member configured to transfer heat from the control substrate, and a first connecting member configured to electrically connect the movable unit and the control substrate. The first heat radiating member or the second heat radiating member and the third heat radiating member are connected to the heat radiating plate. The heat radiating plate has an opening. A first length of the opening in a direction orthogonal to a transmission direction of the signal is longer than a second length of the opening in the transmission direction in the first connecting member.

Further features of various embodiments of the disclosure will become apparent from the following description of embodiments with reference to the attached drawings.

DETAILED DESCRIPTION

Referring now to the accompanying drawings, a detailed description will be given of embodiments according to the disclosure.

This embodiment will discuss an image pickup apparatus having an image sensor (heat generator) as an example of an electronic apparatus, but is not limited to this example and is applicable to another electronic apparatus other than the image pickup apparatus (electronic apparatus having an electronic component (heat generator) other than the image sensor).

Figure 1A:
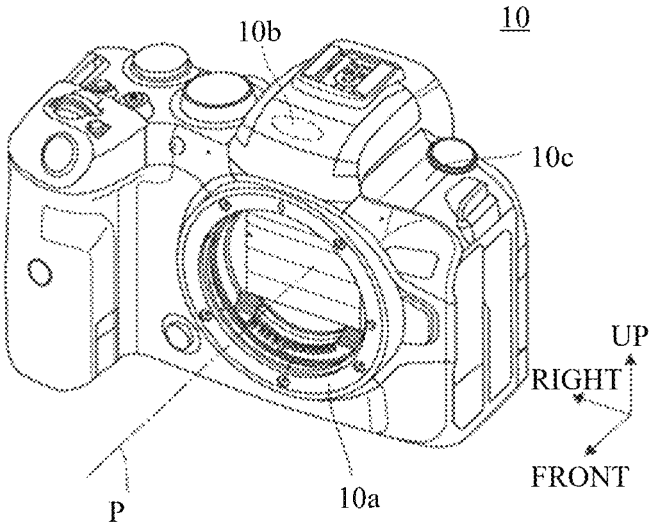
FIGS. 1A and 1B are perspective views of an electronic apparatus according to this embodiment.
Figure 1B:
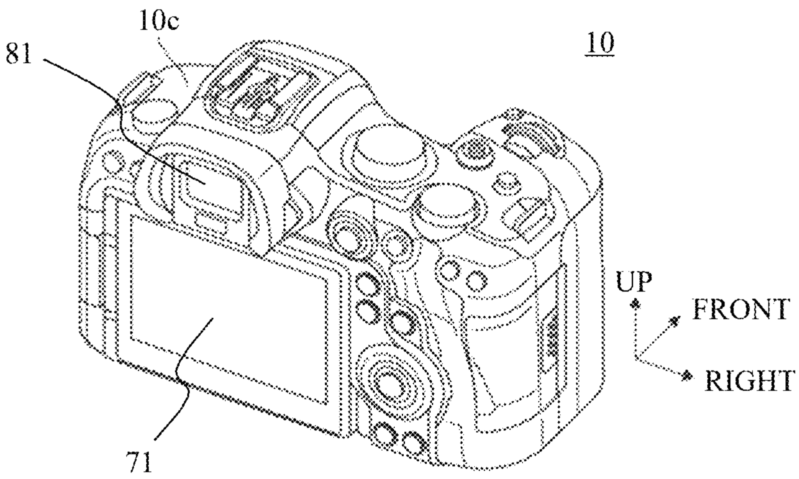

Referring now to FIGS. 1A and 1B, a description will be given of a schematic configuration of an image pickup apparatus (electronic apparatus) 10 according to this embodiment. FIGS. 1A and 1B are perspective views of the image pickup apparatus 10. Regarding the direction of the image pickup apparatus 10, the object side is defined as the front (surface) side based on a direction viewed from the user, and the vertical (up-down) direction, the depth (front-rear) direction, and the lateral (left-right) direction are defined as viewed from the user directly facing the back of the image pickup apparatus 10. Thus, FIG. 1A is a perspective view (front perspective view) of the image pickup apparatus 10 viewed from the front side (object side), and FIG. 1B is a perspective view (rear perspective view) of the image pickup apparatus 10 viewed from the rear side (rear side). This embodiment will discuss a lens interchangeable type camera in which a lens apparatus (interchangeable lens) is attached to and detachable from a camera body as the image pickup apparatus 10, but is not limited to this example and is applicable to an image pickup apparatus in which a camera body and a lens apparatus are integrated.

The image pickup apparatus 10 includes an exterior part 10*c*. The exterior part 10*c* includes a plurality of members. The image pickup apparatus 10 includes a mount 10*a* on the front side. The interchangeable lens (lens apparatus) (not illustrated) can be mounted on the mount 10*a*. An axis passing through the center of the mount 10*a* approximately coincide with an optical axis P (alternate long and short dash line in FIG. 1A) of the imaging optical system of the interchangeable lens, that is, the imaging optical axis. The image pickup apparatus 10 includes a liquid crystal monitor 71 and an EVF panel 81, which display image data captured by an image sensor 230 and setting information about imaging.

Figure 2:
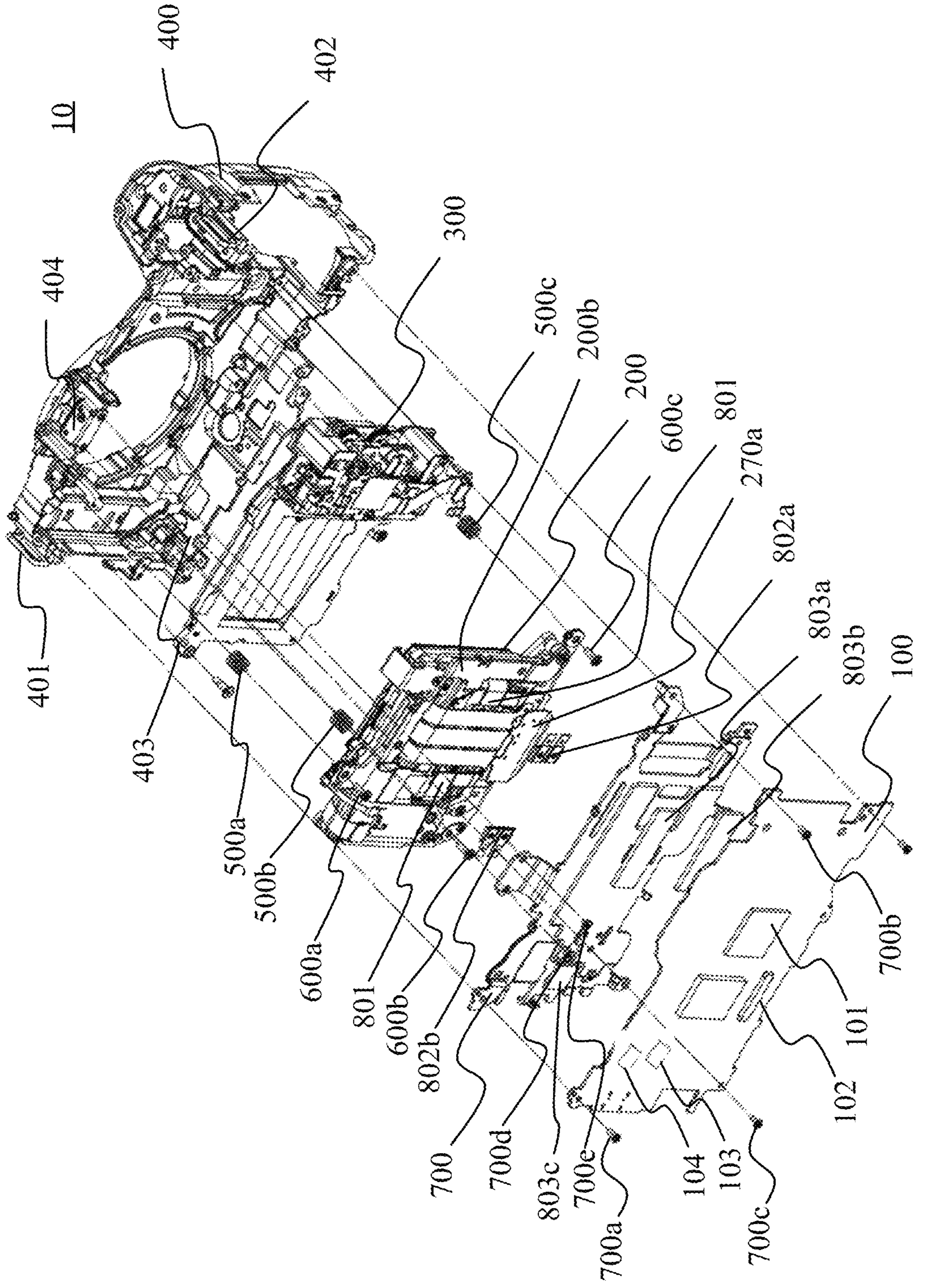
FIG. 2 is an exploded perspective view of the electronic apparatus according to this embodiment.

Referring now to FIG. 2, the internal configuration of the image pickup apparatus 10 will be described. FIG. 2 is an exploded perspective view of the main parts of the image pickup apparatus 10 viewed from the rear side (back side). FIG. 2 omits some components of the image pickup apparatus 10, such as the exterior part 10*c*. FIG. 2 and subsequent figures will illustrate only the portions necessary for understanding this embodiment, and will omit unnecessary portions.

The image pickup apparatus 10 includes a control substrate 100, an image stabilizing unit 200, a shutter unit 300, a base member 400, and a heat radiating plate 700. The image stabilizing unit 200 constitutes an image stabilizing apparatus that performs image stabilization of an image. A control unit of the image stabilizing apparatus is provided on the control substrate 100.

The image stabilizing unit 200 includes a movable optical member. The image stabilizing unit 200 is fixed to the base member 400 together with the shutter unit 300. The image stabilizing unit 200 is held by the base member 400 to which the shutter unit 300 is assembled and fixed. For example, the image stabilizing unit 200 is supported by three screws 600*a*, 600*b*, and 600*c* and three coil springs 500*a*, 500*b*, and 500*c* so as to be displaceable (movable) in a direction (optical axis direction) along the optical axis P (see FIG. 1A) relative to the base member 400. An assembly worker adjusts fastening amounts of the screws 600*a*, 600*b*, and 600*c*. This structure can adjust the tilt of the imaging surface of the image sensor (electronic component) 230 (see FIG. 4B) relative to the base member 400, and the position on the optical axis P. Once the adjustment of the tilt of the imaging surface is completed, the screws 600*a*, 600*b*, and 600*c* are adhered to and fixed to the fixed unit of the image stabilizing unit 200 to prevent them from loosening. The fixed unit 200*b* (see FIG. 3) is a support member, and its details will be described later with reference to FIG. 3.

The control substrate 100 and the base member 400 are fixed to the exterior part 10*c*. A signal (imaging signal) output from the image sensor 230 is transmitted to the control substrate 100. A control IC 101 that is used to control the imaging signal, and connectors 102, 103, and 104 are mounted on the control substrate 100. Various electronic components (not illustrated) such as chip resistors, ceramic capacitors, inductors, and transistors are also mounted on the control substrate 100.

The image pickup apparatus 10 includes a first connecting member 270*a*, a second connecting member 270*b*, and a third connecting member 240, each extending from the image stabilizing unit 200 as flexible wiring members. The first connecting member 270*a* is connected to the connector 102. The second connecting member 270*b* is connected to the connector 103. The third connecting member 240 is connected to the connector 104. Thereby, the control substrate 100 and the image stabilizing unit 200 are electrically connected.

The heat radiating plate 700 is disposed between the control substrate 100 and the image stabilizing unit 200 (fixed unit 200*b*). The heat radiating plate 700 is supported by earrings 401 and 402, a bottom heat radiating plate 403, and a top heat radiating plate 404, which are plate members attached to the base member 400 together with the control substrate 100 by screws 700*a*, 700*b*, 700*c*, 700*d*, and 700*e*. Each of the heat radiating plate 700, the bottom heat radiating plate 403, and the top heat radiating plate 404 is made of a metal material such as copper or aluminum, which has a high thermal conductivity. The earrings 401 and 402 are made of a metal material such as stainless steel or iron, which has a lower thermal conductivity than that of metal materials such as copper or aluminum, in order to suppress the transfer of heat to the grip portion held by the user of the image pickup apparatus 10.

The image stabilizing unit 200 includes a first heat radiating member 801. The first heat radiating member 801 is connected to second elastic heat radiating members (second heat radiating members) 802*a* and 802*b* provided on the heat radiating plate 700, and transfers heat from the image stabilizing unit 200 to the heat radiating plate 700. Third elastic heat radiating members (third heat radiating members) 803*a*, 803*b*, and 803*c* are provided between the heat radiating plate 700 and the control substrate 100. The third elastic heat radiating members 803*a*, 803*b*, and 803*c* dissipate (transfer) heat from electronic components such as ICs provided on the control substrate 100 to the heat radiating plate 700.

Figure 3A:
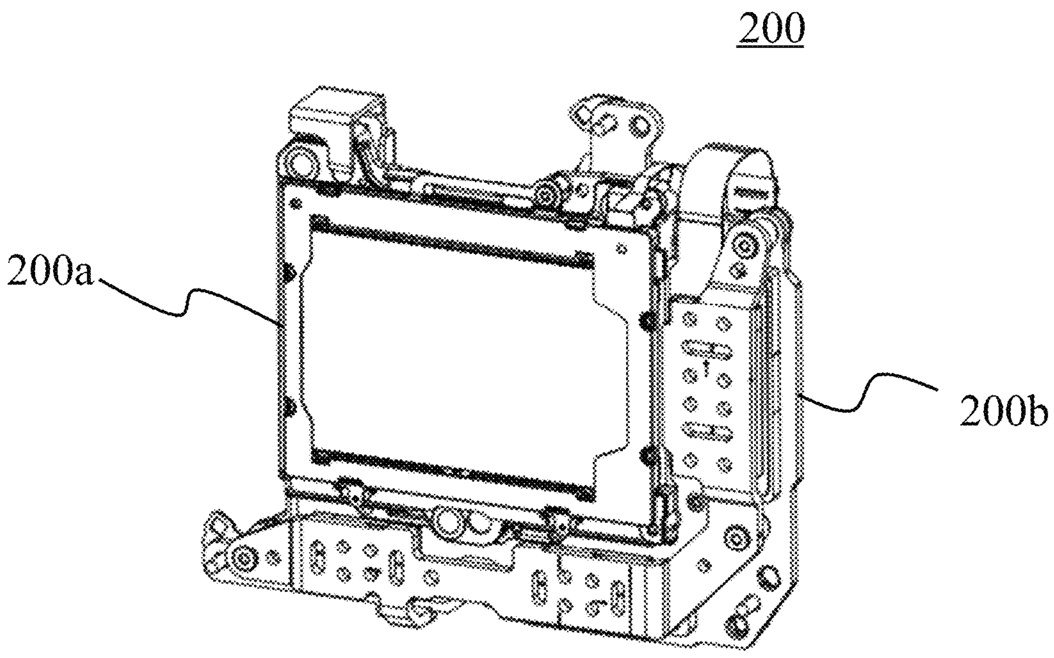
FIGS. 3A and 3B are perspective views of an image stabilizing unit according to this embodiment.
Figure 3B:
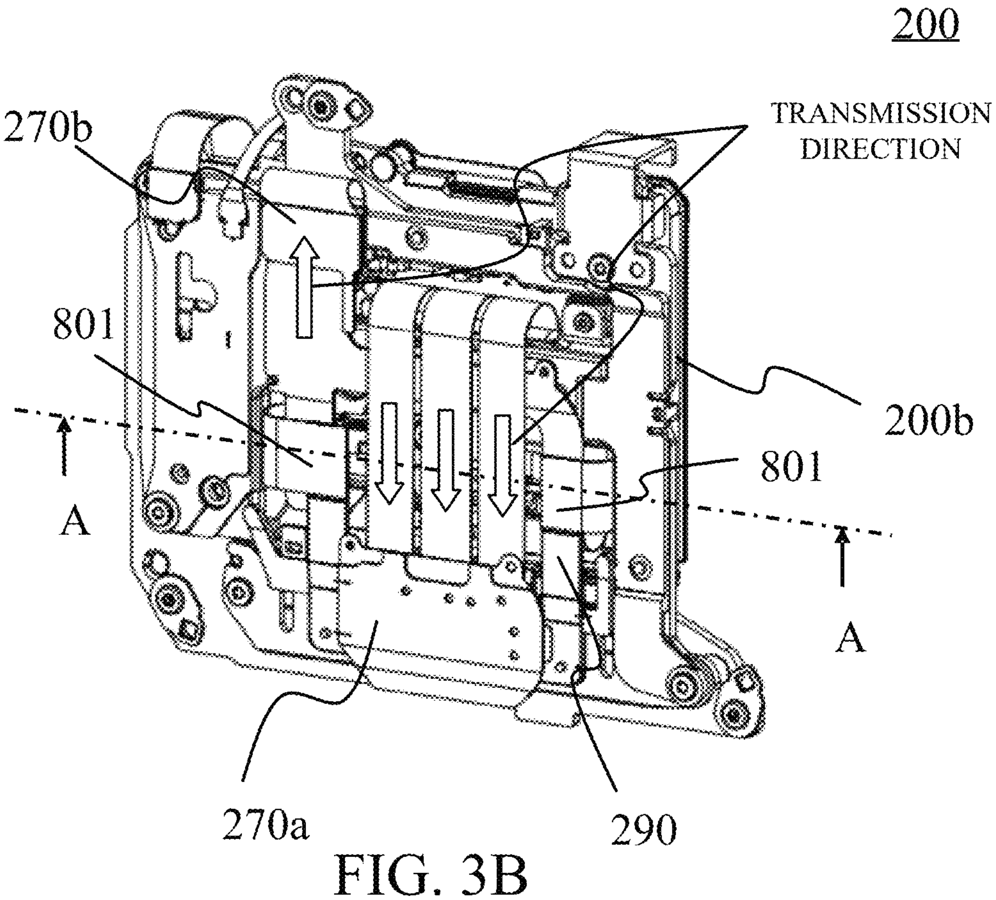
Figure 4A:
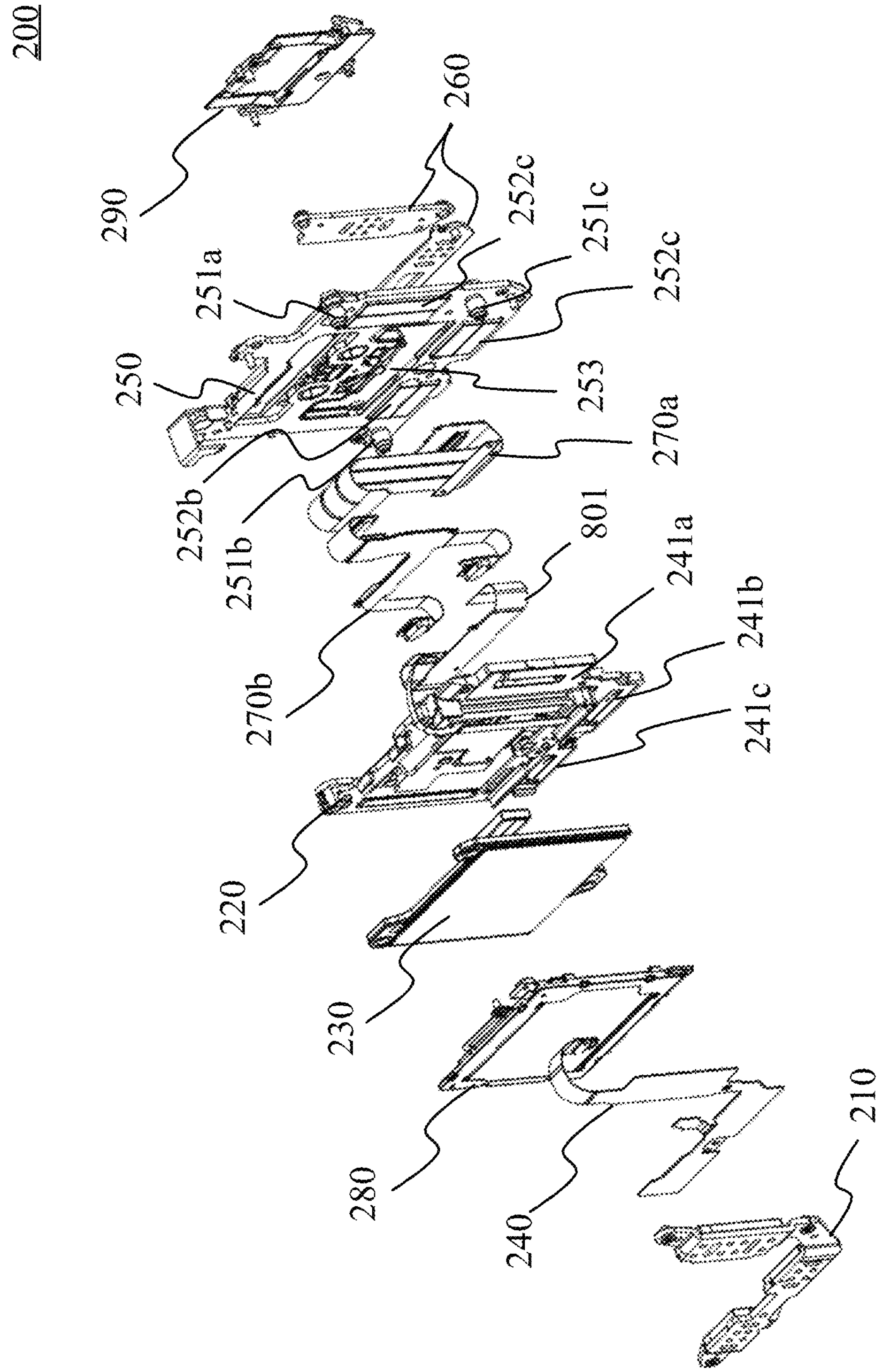
FIGS. 4A and 4B are exploded perspective views of the image stabilizing unit according to this embodiment.
Figure 4B:
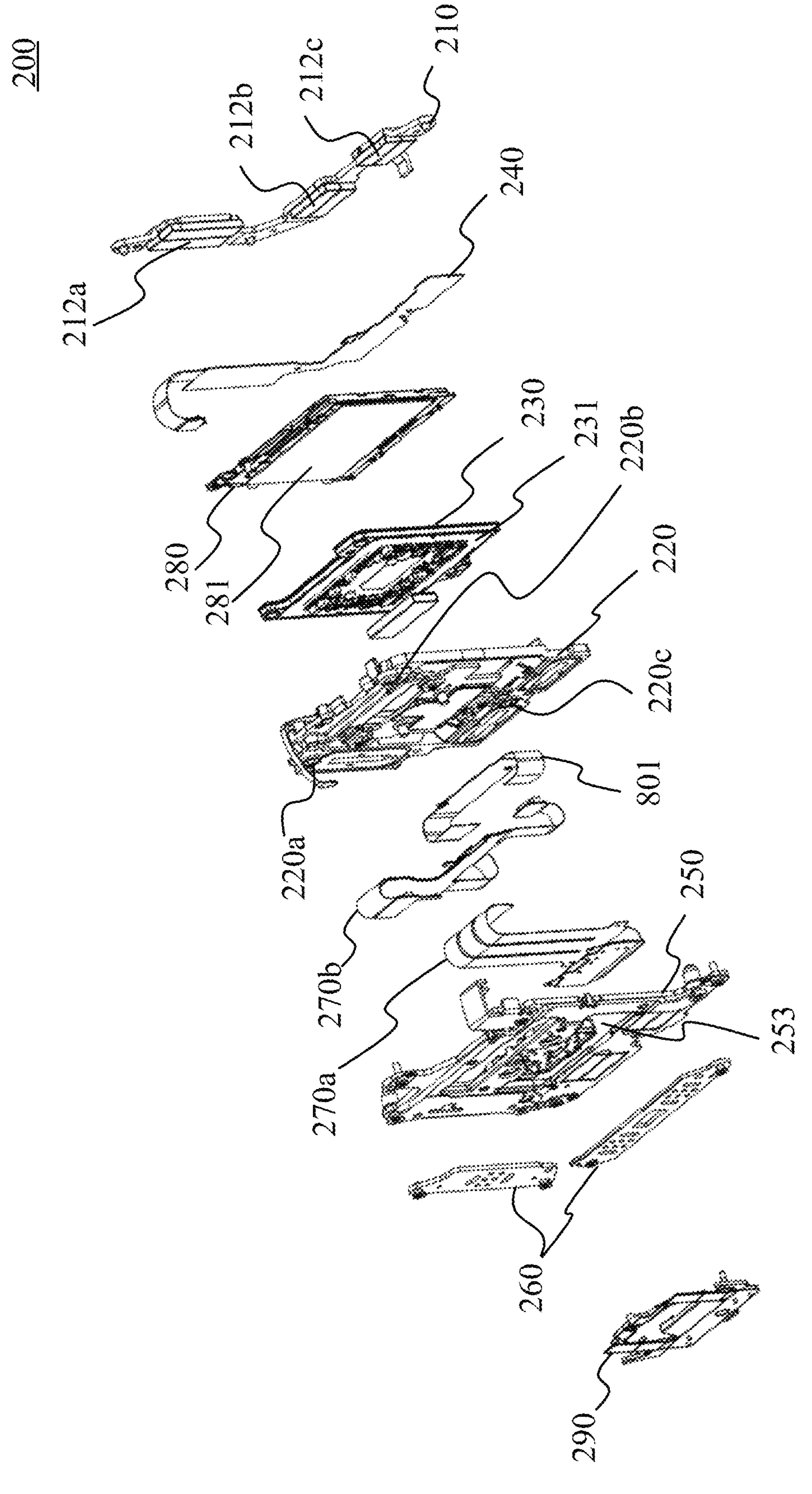

Referring now to FIGS. 3A, 3B, 4A, and 4B, the image stabilizing unit 200 will be described. FIG. 3A is a front perspective view of the image stabilizing unit 200, and FIG. 3B is a rear perspective view of the image stabilizing unit 200. FIG. 4A is an exploded front perspective view of the image stabilizing unit 200, and FIG. 4B is an exploded rear perspective view of the image stabilizing unit 200.

The image stabilizing unit 200 includes a movable unit 200*a* and a fixed unit 200*b*. The movable unit 200*a* is a movable member including the image sensor 230. The fixed unit 200*b* is a support member fixed to the base member 400. The fixed unit 200*b* is configured so that the position of the image sensor 230 can be adjusted in the optical axis direction. The movable unit 200*a* is supported by the fixed unit 200*b* in a state in which it can be displaced in an arbitrary direction (a direction different from the optical axis direction) in a plane orthogonal to the optical axis P relative to the fixed unit 200*b*. The optical image stabilization is achieved by moving the movable unit 200*a* in the direction orthogonal to the optical axis P.

The fixed unit 200*b* mainly includes a front yoke 210, a fixed base plate 250, and a rear yoke 260. The movable unit 200*a* mainly includes a movable base holder 220, an image sensor substrate 231, a sensor holder 280, and a third connecting member 240. Each of the first connecting member 270*a* and the second connecting member 270*b* connects the image sensor substrate 231 and the control substrate 100. The third connecting member 240 connects the movable base holder 220 and the control substrate 100. Each of the first connecting member 270*a*, the second connecting member 270*b*, and the third connecting member 240 includes an FPC.

The movable unit 200*a* includes the image sensor substrate 231. The image sensor 230 is mounted on the image sensor substrate 231. The image sensor 230 is a complementary metal oxide semiconductor (CMOS) image sensor or a charge-coupled device (CCD) image sensor, and converts an optical image of an object into an electrical signal. The image sensor 230 and the image sensor substrate 231 are adhered to and fixed to the movable base holder 220. The sensor holder 280 equipped with an optical low-pass filter 281 is disposed in front of the image sensor 230. The optical low-pass filter 281 is an optical element for preventing the incidence of infrared rays and preventing the occurrence of color moiré.

Three openings are formed in the movable base holder 220, and three coils 241*a*, 241*b*, and 241*c* are mounted in the three openings. The third connecting member 240 is disposed so as to overlap the three coils 241*a*, 241*b*, and 241*c*. One end of the third connecting member 240 is electrically connected to the coils 241*a*, 241*b*, and 241*c*. The other end of the third connecting member 240 is electrically connected to the connector 104 of the control substrate 100.

The movable base holder 220 has three metal balls arranged in three ball receivers 220*a*, 220*b*, and 220*c* (see FIG. 4B), which are received on the plane portion of the opposing fixed base plate 250. When the three metal balls roll, the movable base holder 220 can be displaced in an arbitrary direction in a plane orthogonal to the optical axis P. Magnets 212*a*, 212*b*, 212*c* are adhered to and fixed to the front yoke 210 (see FIGS. 4A and 4B) at predetermined positions on the surface opposite to the movable base holder 220.

The fixed base plate 250 has openings 251*a*, 251*b*, and 251*c* formed at different positions when viewed from the direction of the optical axis P (optical axis direction). Magnets 252*a*, 252*b*, and 252*c* are respectively incorporated in the openings 251*a*, 251*b*, and 251*c*. On the fixed base plate 250, pillars 251*a*, 251*b*, and 251*c* are erected facing the front yoke 210 to fix the front yoke 210, and the front yoke 210 and the fixed base plate 250 are joined so as to sandwich the movable base holder 220.

When viewed from the direction of optical axis P, the magnets 212*a*, 212*b*, 212*c*, 252*a*, 252*b*, and 252*c* are formed in approximately the same positions and shapes as those of corresponding coils 241*a*, 241*b*, and 241*c*, respectively, and sandwich the coils 241*a*, 241*b*, and 241*c*. The magnets 212*a*, 212*b*, 212, 252*a*, 252*b*, and 252*c* are arranged at positions so that their centers are approximately aligned with the centers of the corresponding coils 241*a*, 241*b*, and 241*c*. An electric signal from the control substrate 100 is applied to the coils 241*a*, 241*b*, and 241*c* via the third connecting member 240. At this time, electromagnetic forces are generated between the magnets 212*a*, 212*b*, and 212 and the magnets 252*a*, 252*b*, and 252*c*. This electromagnetic force allows the movable base holder 220 to perform optical image stabilization.

The assembly worker attaches the rear yoke 260 to the fixed base plate 250 from the rear side so that the magnets 252*a*, 252*b*, and 252*c* are housed inside the openings 251*a*, 251*b*, and 251*c*, respectively. Each of the rear yoke 260 and the fixed base plate 250 is made of a ferromagnetic material. The assembly worker can achieve magnetic attraction by simply aligning the rear yoke 260, to which the magnets 252*a*, 252*b*, and 252*c* are attached, with the fixed base plate 250 and bringing them into contact. In other words, the two parts can be joined without using adhesive.

An opening 253 is formed in the fixed base plate 250. While the movable base holder 220 is sandwiched between the front yoke 210 and the fixed base plate 250, the image sensor substrate 231 is exposed from the opening 253 to the rear side. The first connecting member 270*a* and the second connecting member 270*b* are connected to the rear surface of the image sensor substrate 231. The assemble worker installs the first connecting member 270*a* and the second connecting member 270*b* into the image sensor substrate 231 from the rear side by passing them through the opening 253. They are electrically connected by being connected with solder or a connector.

Each of the first connecting member 270*a* and the second connecting member 270*b* has a long plate shape in the vertical direction of the image pickup apparatus 10, is bent in a semicircular arc shape, and is flexible so as not to interfere with the image stabilization of the movable base holder 220. As described above, the first connecting member 270*a* is connected to the connector 102 of the control substrate 100, and the second connecting member 270*b* is connected to the connector 103. As illustrated in FIG. 3B, the transmission direction of the first connecting member 270*a* and the second connecting member 270*b* is the longitudinal direction of the first connecting member 270*a* and the second connecting member 270*b*, which is the vertical direction of the image pickup apparatus 10. The first connecting member 270*a* and the second connecting member 270*b* transmit the electric signal from the image sensor substrate 231 to the control substrate 100.

Figure 5A:
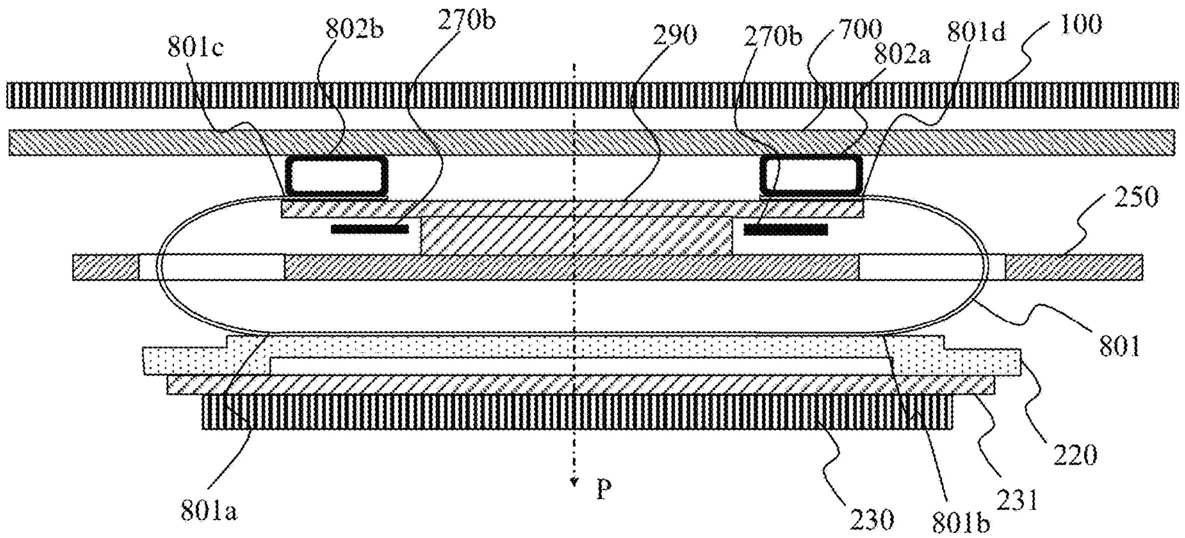
FIGS. 5A and 5B are sectional views of the image stabilizing unit according to this embodiment.
Figure 5B:
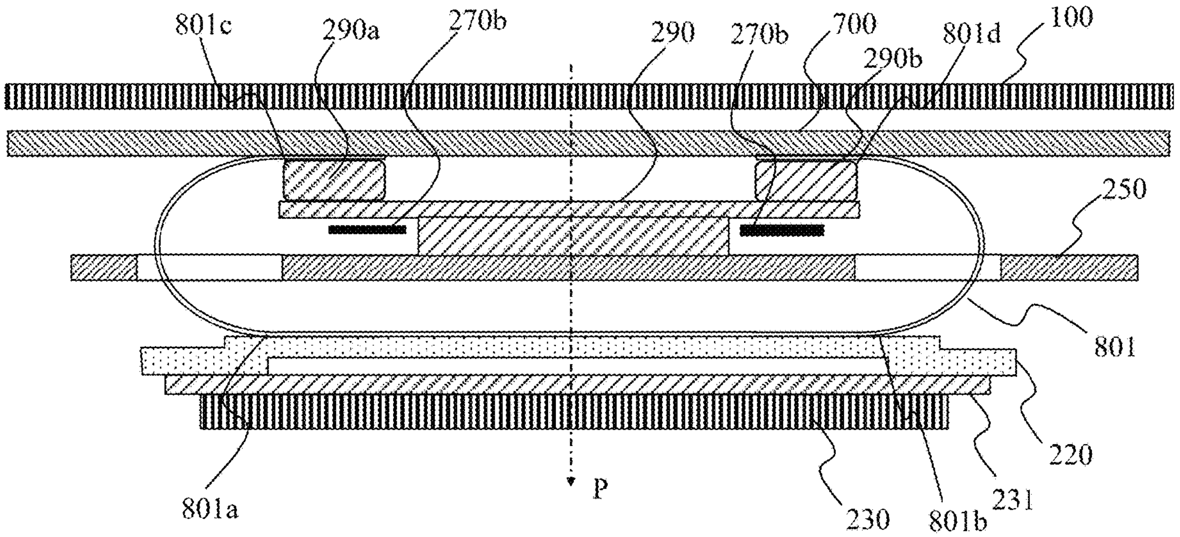

Referring now to FIGS. 5A and 5B, a description will be given of a structure according to this embodiment for obtaining a high heat radiating effect while suppressing an increase in load caused by the displacement of heat radiating members such as the first heat radiating member 801. FIG. 5A is a sectional view of a main part of the image stabilizing unit 200, and corresponds to a section taken along a line A-A of the image stabilizing unit 200 illustrated in FIG. 3B. The movable base holder 220 is made of a magnesium alloy or aluminum alloy, which is a metal with high heat dissipation property, and transfers heat from the image sensor substrate 231 that is adhered to the movable base holder 220.

The first heat radiating member 801 is a flexible sheet member such as a graphite sheet. The center of the first heat radiating member 801 (fixed parts (first connectors) 801*a* and 801*b*) is adhered to and fixed to the movable base holder 220. Both ends of the first heat radiating member 801 (fixed parts (second connectors) 801*c* and 801*d*) are bent into a semicircular arc shape and adhered to and fixed to the fixed holder 290 provided on the fixed base plate 250. Thereby, the first heat radiating member 801 can reduce the load applied to the movable base holder 220 in the direction along the optical axis P (optical axis direction). Since the first heat radiating member 801 is flexible, when the movable base holder 220 moves in the plane orthogonal to the optical axis P due to the image stabilization, the first heat radiating member 801 deforms, thereby suppressing the load.

The fixed parts (first connectors) 801*a* and 801*b* at the center of the first heat radiating member 801 and the fixed parts (second connectors) 801*c* and 801*d* having semicircular shapes at both ends are arranged so as to approximately coincide in the optical axis direction. That is, when viewed from a direction orthogonal to the moving direction of the movable unit 200*a* (the in-plane direction in which the movable unit 200*a* moves), at least parts of the fixed parts 801*c* and 801*d* of the first heat radiating member 801 overlap the fixed parts 801*a* and 801*b*. This provides uniform flexibility with respect to the optical axis P in a plane orthogonal to the optical axis P.

The second elastic heat radiating members 802*a* and 802*b* provided on the heat radiating plate 700 contact (are pressed against) both end portions (fixing parts 801*c* and 801*d*) of the first heat radiating member 801 adhered to and fixed to the fixed holder 290 and the heat radiating plate 700, and radiate heat from the image sensor substrate 231 to the heat radiating plate 700. The second elastic heat radiating members 802*a* and 802*b* are elastic members such as heat-dissipating rubber or a graphite sheet rolled into a cylindrical shape that has elasticity (flexibility) at least in the optical axis direction (direction orthogonal to the moving direction of the movable unit 200*a*). Thereby, the reaction force against the image stabilizing unit 200 in the optical axis direction can be suppressed, and a decrease in the installation accuracy of the image stabilizing unit 200 in the optical axis direction can be suppressed. The load in the optical axis direction of the second elastic heat radiating members 802*a* and 802*b* is applied only to the fixed holder 290 and the fixed base plate 250. In other words, this load is not applied to the movable base holder 220, and therefore does not impede the image stabilization.

The second connecting member 270*b* is disposed on the side opposite to the connection surfaces with both ends (fixed portions 801*c* and 801*d*) of the first heat radiating member 801 of the fixed holder 290 constituting the fixed unit 200*b*. This prevents the first heat radiating member 801 and the second connecting member 270*b* from coming into contact with each other when the movable base holder 220 moves, thereby preventing the respective flexibility from being impeded.

FIG. 5B is a sectional view of the main parts in a case where the second elastic heat radiating members 802*a* and 802*b* are not provided, unlike FIG. 5A. The fixed holder 290 has elastic parts 290*a* and 290*b*, and both ends of the first heat radiating member 801 are connected to the elastic parts 290*a* and 290*b*. The elastic parts 290*a* and 290*b* press (contact) both ends (fixed parts 801*c* and 801*d*) of the first heat radiating member 801 against (contact with) the heat radiating plate 700. At this time, the elastic parts 290*a* and 290*b* have elasticity (flexibility) in the optical axis direction (direction orthogonal to the moving direction of the movable unit 200*a*), and suppress the reaction force in the optical axis direction to the image stabilizing unit 200. The elastic parts 290*a* and 290*b* may be leaf springs integrated with the fixed holder 290, or elastic members such as rubber or urethane separated from the fixed holder 290 may be pasted.

Figure 6A:
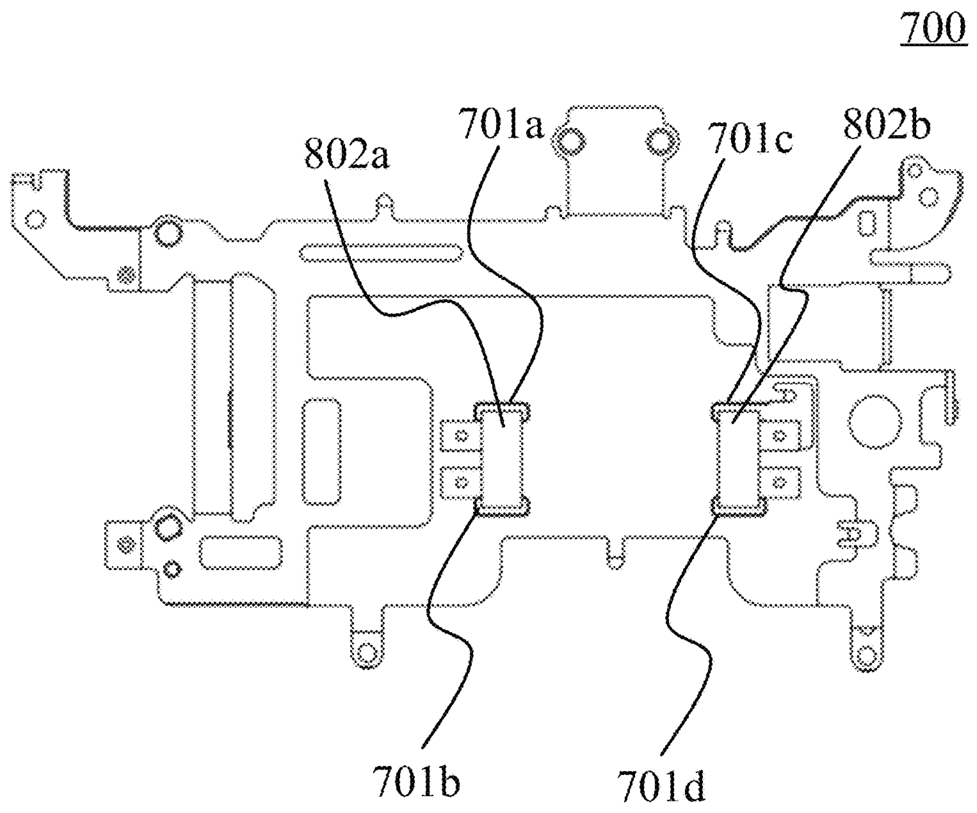
FIGS. 6A and 6B are layout diagrams of a heat radiating member provided on a heat radiating plate according to this embodiment.
Figure 6B:
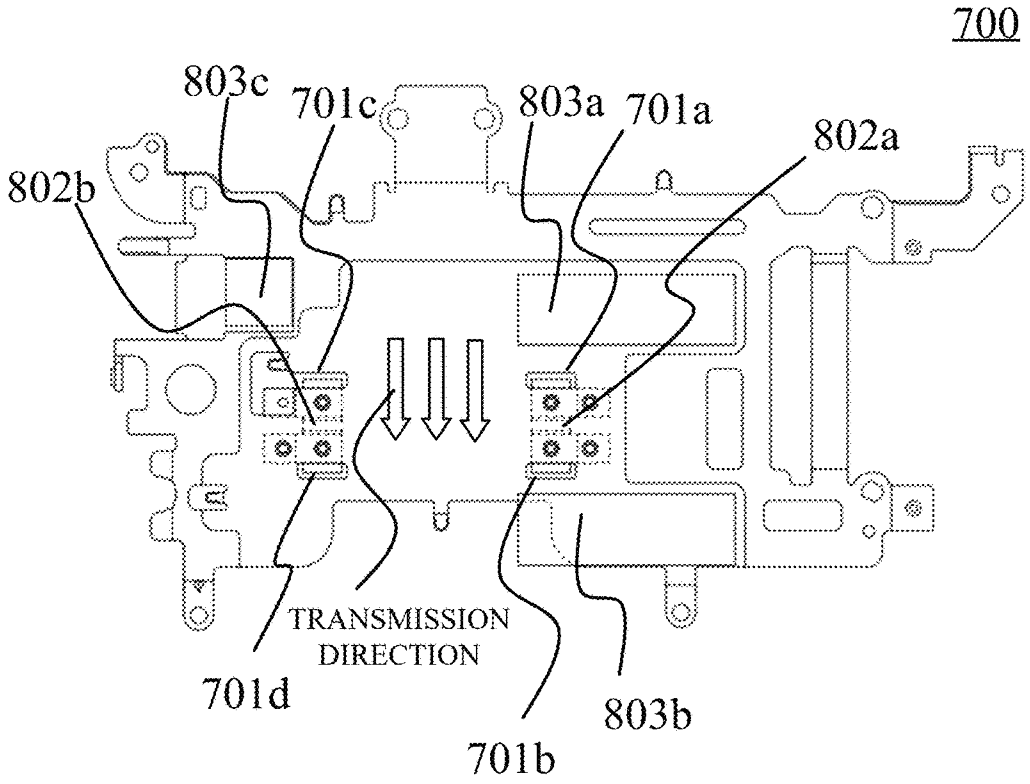

Referring now to FIGS. 6A and 6B, a description will be given of the arrangement of the second elastic heat radiating members 802*a* and 802*b* and the third elastic heat radiating members 803*a*, 803*b*, and 803*c* provided on the heat radiating plate 700. FIG. 6A is an arrangement diagram of the second elastic heat radiating members 802*a* and 802*b* provided on the heat radiating plate 700 when the image pickup apparatus 10 is viewed from the front side (object side). FIG. 6B is an arrangement diagram of the third elastic heat radiating members 803*a*, 803*b*, and 803*c* provided on the heat radiating plate 700 when the image pickup apparatus 10 is viewed from the rear side (rear side).

The second elastic heat radiating members 802*a* and 802*b* are arranged on the left and right sides of the image pickup apparatus 10, respectively. As described above, the first connecting member 270*a* is wired between the two second elastic heat radiating members 802*a* and 802*b* so as to transmit an electrical signal from the image sensor substrate 231 in the vertical direction (transmission direction) of the image pickup apparatus 10. In FIG. 6B, the transmission direction of the electrical signal is indicated by arrows.

As illustrated in FIG. 6B, the third elastic heat radiating members 803*a* and 803*b* are respectively disposed above and below the second elastic heat radiating member 802*a*, and the third elastic heat radiating member 803*c* is disposed above the second elastic heat radiating member 802*b*. Thus, the second elastic heat radiating member 802*a* and the third elastic heat radiating members 803*a* and 803*b* are arranged along a direction parallel to the transmission direction of the first connecting member 270*a*. The second elastic heat radiating member 802*b* and the third elastic heat radiating member 803*c* are disposed along a direction parallel to the transmission direction of the first connecting member 270*a*.

Figure 7:
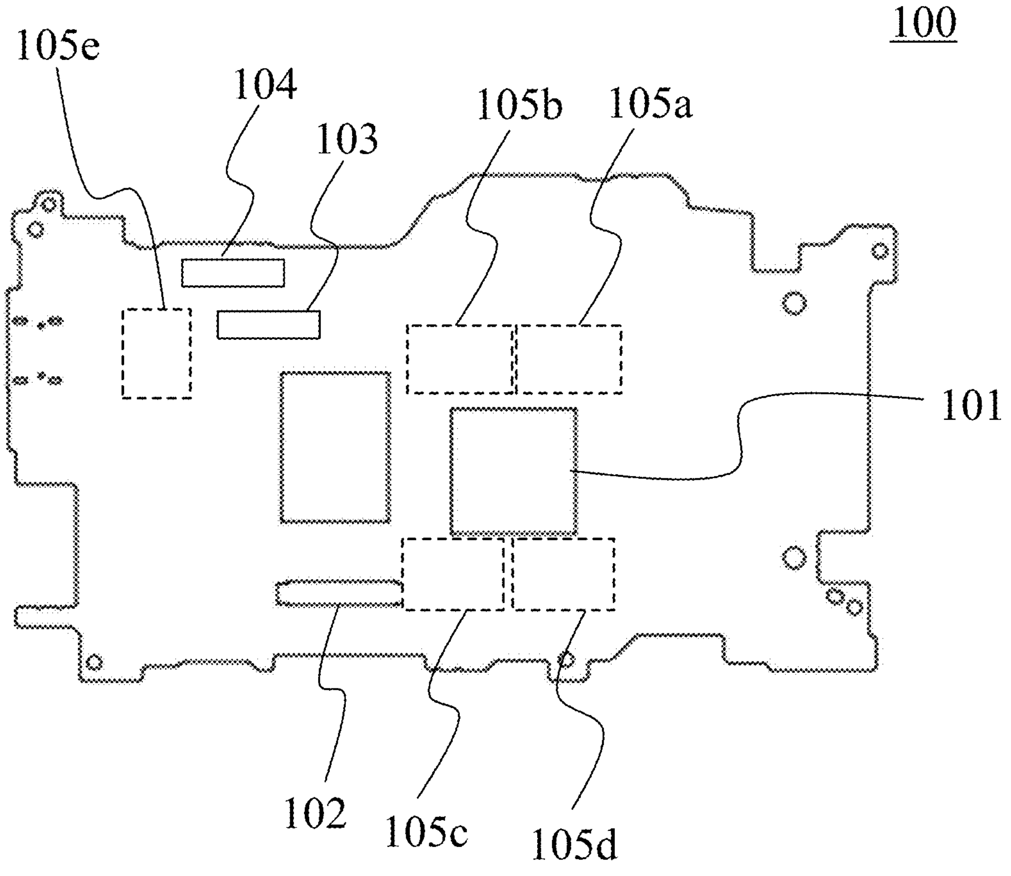
FIG. 7 is a schematic view of a control substrate according to this embodiment.

Referring now to FIG. 7, the control substrate 100 will be described in detail. FIG. 7 is a schematic diagram of the control substrate 100 when viewed from the rear of the image pickup apparatus 10. As described above, the control IC 101 and the connectors 102, 103, and 104 are mounted on the rear side of the control substrate 100. As illustrated by the dotted lines, control ICs 105*a*, 105*b*, 105*c*, 105*d*, and 105*e*, which are different from the control IC 101, are arranged on the front side of the control substrate 100.

The control ICs 105*a*, 105*b*, 105*c*, 105*d*, and 105*e* and the third elastic heat radiating members 803*a*, 803*b*, and 803*c* provided on the heat radiating plate 700 are approximately aligned on the optical axis P. In other words, the control ICs 105*a* and 105*b* and the third elastic heat radiating member 803*a* at least partially overlap each other when viewed from the optical axis direction. Similarly, when viewed in the optical axis direction, the control ICs 105*c* and 105*d* and the third elastic heat radiating member 803*b* at least partially overlap each other. When viewed in the optical axis direction, the control IC 105*e* and the third elastic heat radiating member 803*c* at least partially overlap each other. This arrangement allows heat from the control ICs 105*a*, 105*b*, 105*c*, 105*d*, and 105*e* to be transferred (dissipated) to the heat radiating plate 700.

In this embodiment, the openings 701*a*, 701*b*, 701*c*, and 701*d* are formed on the upper and lower sides of the second elastic heat radiating members 802*a* and 802*b* of the heat radiating plate 700. This structure prevents heat from the control ICs 105*a*, 105*b*, 105*c*, 105*d*, and 105*e* from flowing back to the image sensor substrate 231 via the second elastic heat radiating members 802*a* and 802*b*.

Each of the openings 701*a*, 701*b*, 701*c*, and 701*d* of the heat radiating plate 700 has a long shape (rectangular shape) in a direction orthogonal to the transmission direction of the first connecting member 270*a* (horizontal direction in FIG. 6B), and is configured not to impair the electromagnetic shielding property of the electrical signal. In other words, the length (first length) of the openings 701*a* to 701*d* in the direction orthogonal to the signal transmission direction in the first connecting member 270*a* is larger than the length (second length) of the openings 701*a* to 701*d* in the transmission direction.

The third elastic heat radiating members 803*a*, 803*b*, and 803*c* are arranged parallel to the transmission direction of the first connecting member 270*a* relative to the second elastic heat radiating members 802*a* and 802*b*. Therefore, due to the openings that are long in the direction orthogonal to the transmission direction, the backflow of heat between the first and second elastic heat radiating members can be effectively suppressed.

This embodiment can provide an electronic apparatus with high heat dissipation properties while suppressing the increase in load caused by the displacement of the heat radiating members.

In this embodiment, an image pickup apparatus is an example of an electronic apparatus, but this embodiment is not limited to this example, and the electronic apparatus may be any electronic apparatus as long as a movable member supported in a displaceable state by a supporting member and a control substrate are connected by a connecting member.

Figure 8:
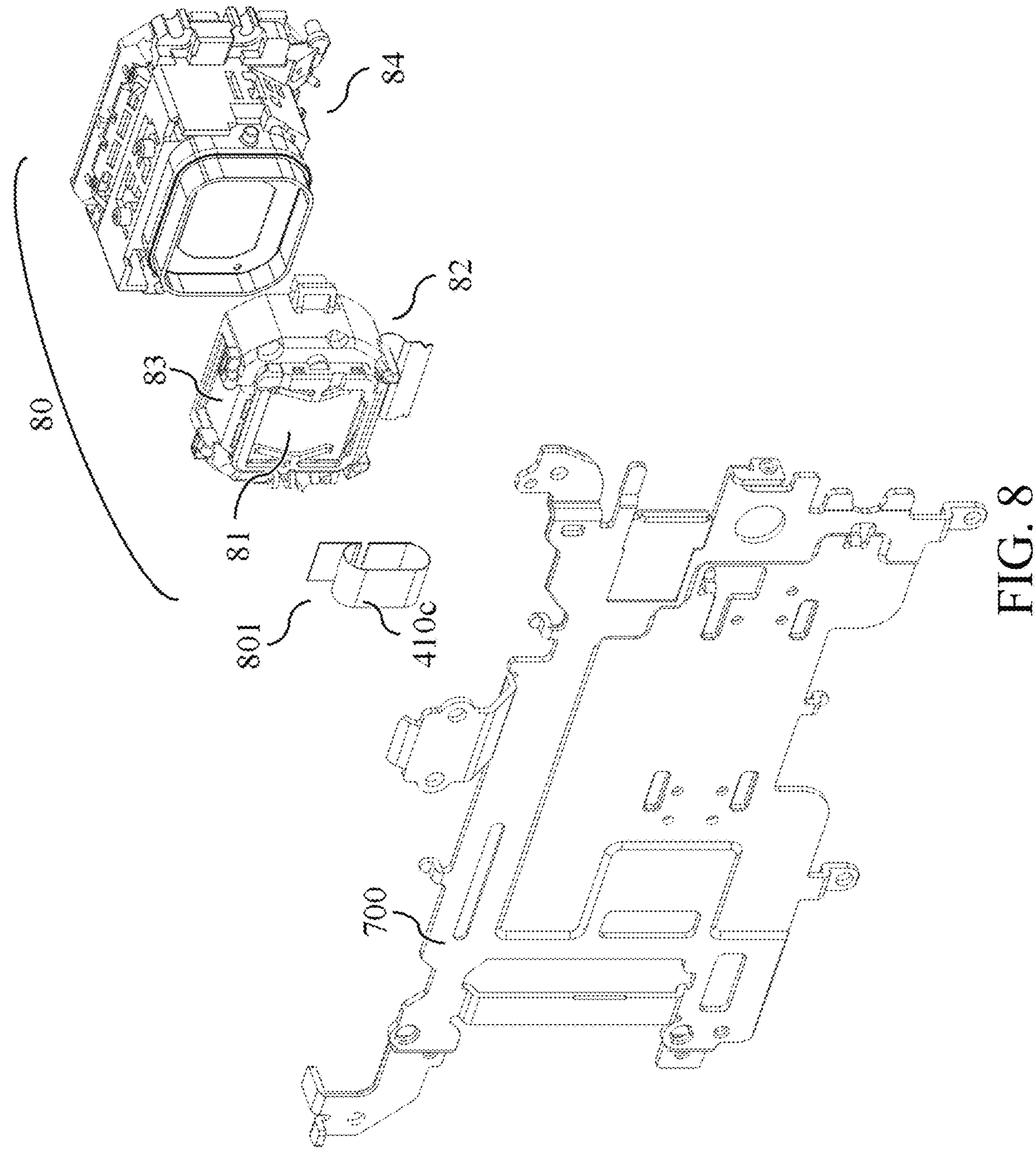
FIG. 8 is an exploded oblique view of the electronic viewfinder (EVF) unit according to this embodiment.

FIG. 8 is an exploded perspective view of an EVF unit (electronic apparatus) 80 according to this embodiment. The EVF unit 80 includes an EVF panel unit 82 and a lens unit 84. The EVF panel unit 82 has a diopter adjusting mechanism (not illustrated) and is displaceable (movable) in the Z-axis direction (optical axis direction) relative to the lens unit 84. The EVF panel unit 82 includes an EVF panel (electronic component) 81 and a panel holder 83 that holds the EVF panel 81. The EVF panel 81 is adhered to and fixed to the panel holder 83. Thus, this embodiment is applicable to an electronic apparatus that includes the EVF panel 81 as an electronic component.

While the disclosure has described example embodiments, it is to be understood that the disclosure is not limited to the example embodiments. The scope of the following claims is to be accorded the broadest interpretation so as to encompass all such modifications and equivalent structures and functions.

This embodiment can provide an electronic apparatus with high heat dissipation property while suppressing an increase in load caused by the displacement of a heat radiating member.

This application claims priority to Japanese Patent Application No. 2024-037274, which was filed on Mar. 11, 2024, and which is hereby incorporated by reference herein in its entirety.

What is claimed is:

1. An electronic apparatus comprising:

a fixed unit;

a movable unit that holds an image sensor, is opposite to the fixed unit, and is movable relative to the fixed unit;

a heat radiating plate opposite to a surface of the fixed unit, which is opposite to a surface of the fixed unit that is opposite to the movable unit;

a first heat radiating member that includes a first connector connected to the movable unit, and a second connector connected to a side of the fixed unit, which is opposite to the heat radiating plate; and a second heat radiating member disposed between the second connector of the first heat radiating member and the heat radiating plate, wherein the first heat radiating member and the heat radiating plate are thermally connected via the second heat radiating member.

2. The electronic apparatus according to claim 1, wherein the second heat radiating member contacts each of the second connector of the first heat radiating member and the heat radiating plate.

3. The electronic apparatus according to claim 1, wherein the second heat radiating member is an elastic member.

4. The electronic apparatus according to claim 1, wherein in a case where the first connector and the second connector are viewed from a direction orthogonal to a moving direction of the movable unit, the second connector at least partially overlaps the first connector.

5. The electronic apparatus according to claim 1, wherein the first heat radiating member is flexible in a moving direction of the movable unit.

6. The electronic apparatus according to claim 1, further comprising a second connecting member electrically connecting the movable unit and a control substrate, wherein the second connecting member is disposed on an opposite side of a connection surface of the fixed unit with the second connector.

7. An electronic apparatus comprising:

a fixed unit;

a movable unit that holds an electronic component and is movable relative to the fixed unit;

a first heat radiating member and a second heat radiating member configured to transfer heat from the electronic component;

a control substrate configured to transmit a signal;

a heat radiating plate provided between the fixed unit and the control substrate;

a third heat radiating member configured to transfer heat from the control substrate; and a first connecting member configured to electrically connect the movable unit and the control substrate, wherein the first heat radiating member or the second heat radiating member and the third heat radiating member are connected to the heat radiating plate, wherein the heat radiating plate has an opening, and wherein a first length of the opening in a direction orthogonal to a transmission direction of the signal is longer than a second length of the opening in the transmission direction in the first connecting member.

8. The electronic apparatus according to claim 7, wherein the second heat radiating member and the third heat radiating member are arranged along a direction parallel to the transmission direction of the first connecting member and are connected to the heat radiating plate.

9. The electronic apparatus according to claim 7, wherein the electronic component is an image sensor configured to convert an optical image of an object into an electrical signal, and wherein the movable unit is movable relative to the fixed unit in a direction different from an optical axis direction of an imaging optical system for image stabilization.

10. The electronic apparatus according to claim 9, wherein the direction different from the optical axis direction is a direction orthogonal to the optical axis direction.

11. The electronic apparatus according to claim 9, wherein the fixed unit is configured to adjust a position of the image sensor in the optical axis direction.

12. The electronic apparatus according to claim 9, wherein the electrical signal output from the image sensor is transmitted to the control substrate.

* * * * *